Feb. 13, 1962  H. P. KALMUS ET AL  3,021,481
PHASEMETER FOR MEASURING VERY SMALL PHASE DIFFERENCES
Filed Jan. 7, 1959  2 Sheets-Sheet 1

INVENTORS
HENRY P. KALMUS
ALBERT L. HEDRICH
BY S. J. Rotondi, A. J. Dupont,
J. P. Edgerton & N. Cass
ATTORNEYS

United States Patent Office

3,021,481
Patented Feb. 13, 1962

3,021,481
PHASEMETER FOR MEASURING VERY SMALL PHASE DIFFERENCES
Henry P. Kalmus, 3000 University Terrace NW., Washington, D.C., and Albert L. Hedrich, 7606 Geranium, Bethesda 14, Md.
Filed Jan. 7, 1959, Ser. No. 785,537
4 Claims. (Cl. 324—83)
(Granted under Title 35, U.S. Code (1952), sec. 266)

The invention described herein may be manufactured and used by or for the Government for governmental purposes without the payment to us of any royalty thereon.

This invention relates generally to phasemeters, and more particularly to an improved phasemeter capable of measuring very small phase angles or time differences existing between two signals.

The measurement of very small phase differences has heretofore posed a serious problem in the art, particularly in servomechanism systems where the detection of small phase differences is a necessity. One solution to this problem is to make use of digital techniques, but this solution requires complicated and expensive circuitry, thus making it undesirable for many applications.

In the present invention, a solution is provided which makes possible the use of a conventional form of phasemeter circuit for measuring very small phase differences, thereby greatly simplifying the circuitry that would otherwise be necessary using digital techniques, or any other of the complex systems which have been devised for this purpose.

In a conventional phasemeter circuit the signals whose phase differences are to be measured are amplified, limited, and differentiated to transform them into pulses positioned at their zero crossover points. A rectifier circuit eliminates the positive pulses corresponding to the positive going zero crossover points, and the resultant negative pulses are then fed to the inputs of a bistable multivbrator whose output consists of rectangular pulses having a duration proportional to the phase difference to be measured. These rectangular pulses are now integrated resulting in a D.-C. voltage whose magnitude is a measure of the phase difference.

When one tries to measure very small phase differences by means of the relatively simple conventional form of circuit described above, two problems arise which prevent its use. First, as the phase difference approaches zero, the multivibrator is not able to recover fast enough to respond to a second pulse occurring too close to the starting pulse. Also, the time at which the second pulse causes triggering will be unreliable. For this reason phase angle differences less than .1 degree cannot be reliably measured using this convention circuit. Secondly, it is very difficult to accurately measure small differences in the D.-C. output voltage from the integrator. To do so requires that the D.-C. circuit voltages be kept very stable so as not to mask the voltage signals obtained due to small phase differences. Also, because the integrator output is a D.-C. signal, amplification is possible only by using D.-C. amplification techniques which are well known to be undesirably complex.

The present invention basically employs the conventional phasemeter circuit with additional novel circuitry being provided to overcome these objectional problems. In a typical embodiment of the invention the additional circuitry involves means whereby the signals whose phase difference is to be measured are switched so as to be alternately shifted in phase by a fixed phase angle, say 180 degrees. This permits the bistable multivibrator to operate with pulses separated by a large time interval so as to overcome the first problem mentioned above. The voltage output of the integrator will then consist of a voltage which alternates at the switching rate between two values—one value being obtained when one of the signals is shifted in phase by 180 degrees, and the other value being obtained when the other signal is shifted in phase by 180 degrees. Since D.-C. voltage variations will affect both values equally, the difference between these values will be independent of any such D.-C. variations, and thus may readily be amplified using standard A.-C. amplification techniques. After amplification, the alternating signal may then be fed to a synchronous detector operating at the alternating switching rate to detect the voltage difference which is a measure of the phase difference. Using such a phasemeter phase differences as small as .005 degree have been detected.

It is the broad object of the present invention, therefore, to provide a simple phasemeter capable of detecting very small phase differences.

Another object is to provide means in combination with a conventional bistable multivibrator type of phasemeter which will permit very small phase differences to be detected.

Yet another object of this invention is to provide a phasemeter which is insensitive to D.-C. circuit voltage variations.

The specific nature of the invention, as well as other objects, uses and advantages thereof, will clearly appear from the following description and from the accompanying drawing, in which.

Figure 1:
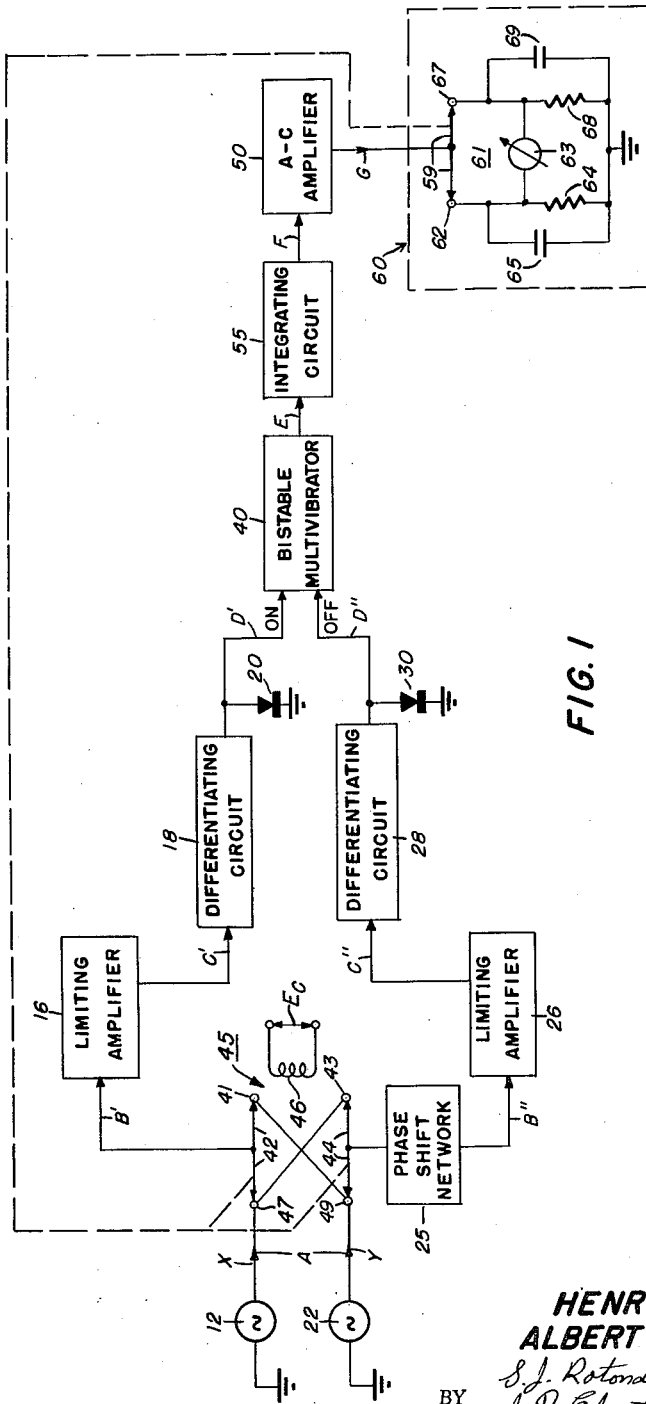
FIG. 1 is a block and circuit diagram of a phasemeter in accordance with the invention.
Figure 2:
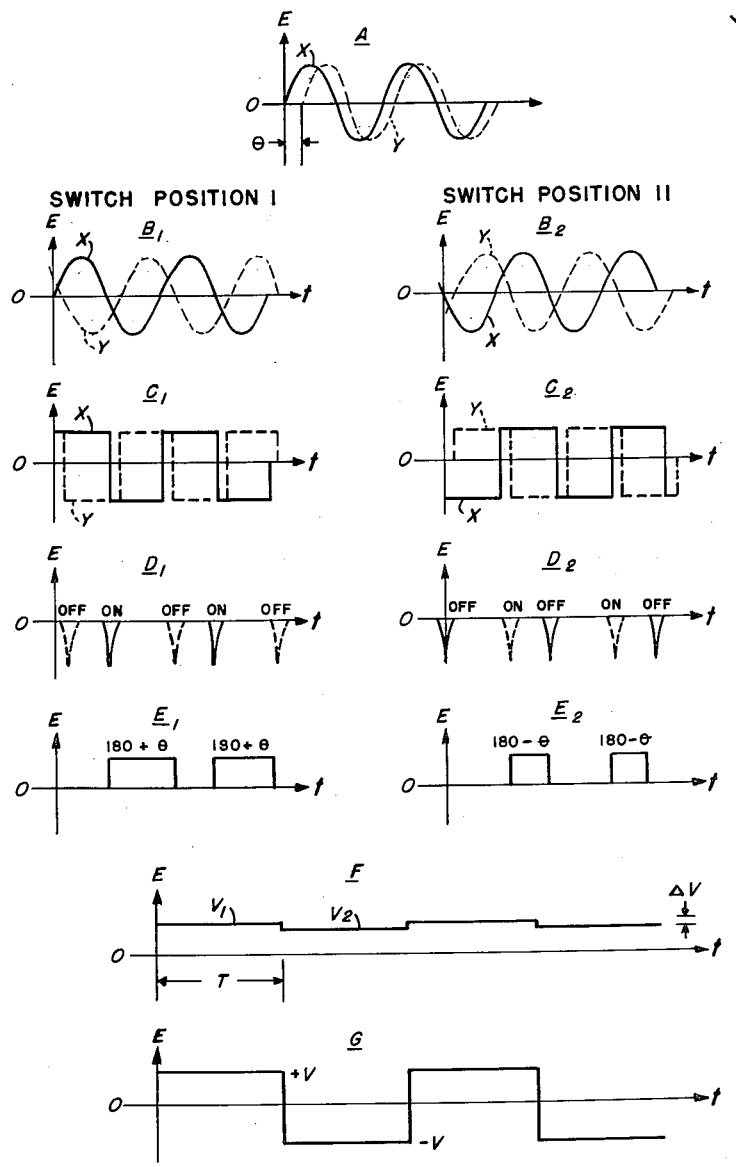
FIG. 2 is a series of graphs illustrating the voltage waveforms at various points in the diagram of FIG. 1.

In FIG. 1 the two signals X and Y whose phase difference $\theta$ is to be measured are represented by generators 12 and 22, the waveforms of these signals being illustrated in FIG. 2 A as solid X and dashed Y lines, respectively. Generator 12 has its output connected to contacts 47 and 43 of the switch 45 and the output of generator 22 is connected to contacts 49 and 41 of switch 45. A moving contact 42 is connected to a first path comprising a limiting amplifier 16, a differentiating circuit 18 and a diode 20. A moving contact 44 in synchronism with the moving contact 42, is connected to a second path comprising a phase shift network 25, a limiting amplifier 26, a differentiating circuit 28, and a diode 30. The moving contacts 42 and 44 are operated at a predetermined switching rate by a suitable driving means 46 excited by a supply voltage $E_c$. As will appear subsequently, the switch 45 may be either mechanical or electronic in nature. Where a mechanical commutator serves as the switch 45, driver 46 is any suitable driving means, such as a small electric motor, actuating a rotor shaft of the commutator. Where electronic switching is employed, element 46 could advantageously be a square wave generator producing gating pulses for electronic switch means. The switch 45 thus causes the signals X and Y from generators 12 and 22, respectively, to be alternately switched between the two paths.

For the purpose of the embodiment of FIG. 1 it will be assumed that the phase shift network 25 provides a delay of 180 degrees, although any other phase shift could also be used. With the switch 45 in a position such that the moving contacts 42 and 44 are respectively connected to the contacts 47 and 49—which will be referred to as position I of the switch 45—the relationship between the signals X and Y at points B' and B" in FIG. 1, respectively, is as shown by $B_1$ of FIG. 2. With the switch 45 in a position such that the moving contacts 42 and 44 are respectively connected to contacts 41 and 43—which will be referred to as position II of the switch 45—the relationship between the signals X and Y now at points B″ and B′ in FIG. 1, respectively, is as shown by $B_2$ of FIG. 2.

After being amplified and limited by limiting amplifiers 16 and 26, the signals X and Y at points C′ and C″, respectively, for switch position I, is as shown by $C_1$ of FIG. 2, while for switch position II, the signals X and Y at points C″ and C′, respectively, is as shown by $C_2$ of FIG. 2. The outputs of the limiting amplifiers 16 and 26, are fed to the differentiating circuits 18 and 28, respectively. The diodes 20 and 30 have their cathodes grounded and their plates connected to the outputs of the differentiating circuits 18 and 28, respectively. Thus, only negative going pulses appear at the on and off inputs of the bistable multivibrator 40 to which the outputs of the differentiating circuits 18 and 28 are respectively connected. These are shown by $D_1$ of FIG. 2 for switch position I and by $D_2$ of FIG. 2 for switch position II. The pulses D′ at the output of the differentiating circuit 18 turn the multivibrator 40 On while the pulses D″ at the output of the differentiating circuit 28 turn it Off, thereby producing a series of rectangular pulses E at the output of the multivibrator 40 as shown by $E_1$ of FIG. 2 for switch position I and $E_2$ of FIG. 2 for switch position II. The pulses corresponding to the negative crossovers of the X and Y signals, respectively, are at D′ and D″ for switch position I and at D″ and D′, for switch position II.

It can be seen from $E_1$ and $E_2$ of FIG. 2 that the rectangular pulses for switch position I have a duration which is $2\theta$ greater than the time duration for the rectangular pulses of switch position II, $\theta$ being the phase difference being measured. The rectangular output pulses E from the multivibrator 40 are then fed to an integrating circuit 55 whose output is shown by F in FIG. 2. The larger voltage output $V_1$ corresponds to the longer duration rectangular pulses shown in $E_1$ while the smaller voltage output corresponds to the shorter duration rectangular pulses shown in $E_2$. The difference $\Delta V$ between these output voltages $V_1$ and $V_2$ is a measure of the phase difference $\theta$ being measured. The period T is determined by the switching rate of the moving contacts 42 and 44 of switch 45. In the case of a mechanical switch 45, for a given rotor size the switching rate depends upon the rotational speed of driving means 46, which may be controlled in any conventional manner. For electronic switching, the switching rate is governed by the operating frequency of square wave generator 46, which can be selected to produce any desired switching rate. The switching rate is preferably considerably slower than the frequency of the signals X and Y whose phase difference $\theta$ is to be measured, but if the switching and integration circuits are suitably chosen, may be at a frequency as high as one-half to one-third of the frequency of the signals X and Y.

It will now be understood that the voltage difference $\Delta V$ will remain constant regardless of any variations in the D.-C. circuit potentials. This is because these D.-C. variations affect the output voltages $V_1$ and $V_2$ in the same way, thereby having no resultant effect on the difference $\Delta V$. The output of the integrating circuit 55 may thus be fed to an A.-C. amplifier 50 to be amplified by ordinary A.-C. amplification techniques. The amplifier 50 should of course be capable of passing the switching frequency of the switch 45. The amplifier output G, which is a measure of the phase difference $\theta$, is shown by G in FIG. 2.

The output G, of the amplifier 50 is fed to a synchronous detector 60 as shown in FIG. 1. The synchronous detector 60 includes the switch 61, the capacitors 65 and 69, and the resistors 64 and 68. The movable contact 59 of the switch 61 is restrained to move synchronously with movable contacts 42 and 44 of switch 45. The contact 62 of switch 61 is connected to one side of the meter 63, and the contact 67 is connected to the other side of the meter 63. The parallel combination of the capacitor 65 and the resistor 64 is connected between the contact 62 and circuit ground, and the parallel combination of the capacitor 69 and the resistor 68 is connected between the contact 67 and circuit ground.

In operation the movable contact 59 of the switch 61 moving in synchronism with the movable contacts 42 and 44 of switch 45 causes one capacitor, say 65, to charge up to the positive peak voltage V+ of the A.-C. output of the amplifier 50 while the capacitor 69 charges up to the negative voltage peak V−. The meter 63 reads the difference between V+ and V−, which is the peak-to-peak values of the square wave shown by G in FIG. 2. When the signals X and Y are in phase, the meter 63 reads zero. For even a very small phase difference the meter 63 reads a voltage which is negative for a difference in phase having one polarity, and positive for a difference in phase having the opposite polarity.

The synchronously operated switches 45 and 61 schematically shown in FIG. 1 may be provided in a variety of well known ways. Either mechanical or electronic switching may be used. Structures for accomplishing this switching are disclosed in the Patents No. 2,724,269 and No. 2,752,435, issued on November 22, 1955, and June 26, 1956, respectively. In Patent No. 2,724,269, FIG. 6 shows a suitable mechanical switch, while FIGS. 7 and 8 illustrate a suitable electronic switching arrangement. The mechanical switch described in more detail in Patent No. 2,752,435 is particularly advantageous where reduction of capacitive cross-coupling is important.

It is to be understood that the embodiment shown in FIG. 1 of the drawing may be modified in various respects within the scope of the invention. For example, the phase delay may just as well provide a leading angle rather than a lagging angle. Also, the phase shift may be introduced after the signals X and Y have been formed into pulses by the differentiating circuits by means such as a phantastron. Also, it is apparent that the signals X and Y need not be sine waves as shown in A of FIG. 2, but each may consist of a series of pulses which are out of phase with one another by some small phase angle.

It is further to be understood that instead of the synchronous detector 60 any A.-C. indication means may be employed. The synchronous detector has the advantage, however, of providing an indication as to the polarity of the phase shift, and also, provides a high signal to noise ratio.

It will be apparent that the embodiments shown are only exemplary and that various modifications can be made in construction and arrangement within the scope of the invention as defined in the appended claims.

We claim as our invention:

1. Means for detecting small differences in phase between two signals, said means comprising in combination: a bistable circuit having an output and two inputs, said circuit producing rectangular pulses at its output having a duration dependent upon the phase difference between signals applied to its inputs, a first path to one of said inputs and a second path to the other of said inputs, a phase shift means in one of said paths, a switching means interposed between said paths and said two signals for alternately switching said two signals between said two paths, the rectangular pulses produced by said circuit thereby having a first duration for one position of said switching means and a second duration for the other position of said switching means, the difference between said first and second durations being a measure of the phase difference between said two signals, and a detection means connected to the output of said circuit for producing an indication of the difference between said first and second durations.

2. A phasemeter capable of measuring very small phase differences between two signals, said phasemeter comprising in combination: a bistable multivibrator having an output and two inputs, said multivibrator producing rectangular pulses at its output having a duration dependent upon the phase difference between pulses applied to said inputs, a first path to one input of said multivibrator and a second path to the other input of said multivibrator, a pulse forming means in each of said paths for forming each of said signals into a series of pulses such that the phase difference between the two series of pulses is representative of the phase difference between said signals, a phase shift means in one of said paths, a switching means interposed between said paths and said signals for alternately switching said signals between said two paths, an integration means having its input connected to the output of said multivibrator for producing a D.-C. voltage output having a magnitude dependent on the duration of the rectangular pulses of said multivibrator, said D.-C. voltage output thereby having a first magnitude for one position of said switching means and a second magnitude for the other position of said switching means, the difference between said first and second magnitudes being a measure of the phase difference between said two signals, and a detection means connected to the output of said integration means for producing an indication of the difference between said first and second magnitudes.

3. The invention in accordance with claim 2 wherein said detection means is a synchronous detector operating synchronously with said switching means.

4. The invention in accordance with claim 3, there being additionally provided: an A.-C. amplification means interposed between said integration means and said synchronous detector for amplifying the output of said integration means prior to detection by said synchronous detector.

References Cited in the file of this patent

UNITED STATES PATENTS

| | | |
|---|---|---|
| 2,125,127 | Roberts | July 26, 1938 |
| 2,513,528 | Sohon | July 4, 1950 |
| 2,631,279 | Bollinger et al. | Mar. 10, 1953 |
| 2,645,755 | Garfield | July 14, 1953 |
| 2,863,117 | Graustein | Dec. 2, 1958 |
| 2,864,950 | Pernick | Dec. 16, 1958 |
| 2,946,004 | Frank | July 19, 1960 |

OTHER REFERENCES

"Measuring Phase at Audio and Ultrasonic Frequencies," article in Electronics, October 1949, pages 114–118.

"Electronic Switching in Phase Measurement," article in Electronics, June 5, 1959, pages 60–61.